(12) United States Patent
Agrawal et al.

(10) Patent No.: US 12,197,097 B2
(45) Date of Patent: *Jan. 14, 2025

(54) ENTRYWAY SYSTEMS WITH VARIABLE LIGHT TRANSMISSION PANELS

(71) Applicant: Glass Dyenamics, Inc., Tucson, AZ (US)

(72) Inventors: Anoop Agrawal, Tucson, AZ (US); Christopher Angelo, Tucson, AZ (US); Clemens Hofbauer, Portland, OR (US); Susana J. Castillo, Tucson, AZ (US); Lori L. Adams, Tucson, AZ (US); John P. Cronin, Tucson, AZ (US)

(73) Assignee: Glass Dyenamics, Inc., Tucson, AZ (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/855,922

(22) Filed: Jul. 1, 2022

(65) Prior Publication Data
US 2023/0007876 A1    Jan. 12, 2023

Related U.S. Application Data

(60) Provisional application No. 63/217,363, filed on Jul. 1, 2021.

(51) Int. Cl.
*G02B 26/00*    (2006.01)
*E06B 3/67*     (2006.01)
(Continued)

(52) U.S. Cl.
CPC .......... *G02F 1/163* (2013.01); *E06B 3/6722* (2013.01); *E06B 9/24* (2013.01); *E06B 3/6612* (2013.01);
(Continued)

(58) Field of Classification Search
CPC ...... G02F 1/1523; G02F 1/1533; G02F 1/155; G02F 1/0102; G02F 1/163; G09G 3/16
(Continued)

(56) References Cited

U.S. PATENT DOCUMENTS 6,141,137 A    10/2000  Byker et al.
6,661,559 B2   12/2003  Byker et al.
(Continued)

FOREIGN PATENT DOCUMENTS

CN    100405201 C      7/2008
CN    107624449 A      1/2018
WO    2019/006402 A1   1/2019

OTHER PUBLICATIONS

Non-Final Office Action issued in U.S. Appl. No. 18/048,134 dated Feb. 14, 2023, 44 pages.
(Continued)

*Primary Examiner* — Dawayne Pinkney
(74) *Attorney, Agent, or Firm* — Rothwell, Figg, Ernst and Manbeck, P.C.

(57) ABSTRACT

The present invention relates to variable optical transmission windows and window panels which are used for architectural applications, particularly in building entryway systems. This disclosure is directed to the use and powering of such panels in door and windows that, in part, physically open by manual or automatic sliding, tilting, pushing or rotating about the hinges, unless specifically mentioned otherwise. The doors may also have other electronic devices which provided added user functionality.

19 Claims, 5 Drawing Sheets

(51) Int. Cl.
  *E06B 9/24* (2006.01)
  *F21V 14/00* (2018.01)
  *G02F 1/15* (2019.01)
  *G02F 1/157* (2006.01)
  *G02F 1/163* (2006.01)
  *G09G 3/19* (2006.01)
  *E06B 3/66* (2006.01)
  *H01M 50/251* (2021.01)

(52) U.S. Cl.
  CPC ... *E06B 2009/2464* (2013.01); *H01M 50/251* (2021.01); *H01M 2220/10* (2013.01)

(58) Field of Classification Search
  USPC ............. 359/265–275, 277, 245–247, 242; 345/49, 105; 250/70; 348/814, 817; 438/929; 349/182–186
  See application file for complete search history.

(56) References Cited

U.S. PATENT DOCUMENTS

| | | |
|---|---|---|
| 7,154,657 B2 | 12/2006 | Poll et al. |
| 7,256,924 B2 | 8/2007 | Guarr et al. |
| 7,450,291 B2 | 11/2008 | Guarr et al. |
| 7,733,555 B2 | 6/2010 | Agrawal et al. |
| 7,990,603 B2 | 8/2011 | Ash et al. |
| 8,547,624 B2 | 10/2013 | Ash et al. |
| 8,736,943 B2 | 5/2014 | Guarr et al. |
| 8,885,242 B2 | 11/2014 | Guarr et al. |
| 11,086,184 B1 | 8/2021 | Bergh et al. |
| 2012/0159826 A1 | 6/2012 | Eichner |
| 2017/0328121 A1 | 11/2017 | Purdy et al. |
| 2018/0088426 A1 | 3/2018 | Posset et al. |
| 2019/0137797 A1 | 5/2019 | Bjergaard et al. |
| 2019/0196292 A1 | 6/2019 | Brown et al. |
| 2020/0241375 A1 | 7/2020 | Barnum et al. |
| 2020/0332591 A1 | 10/2020 | Dierenbach |

OTHER PUBLICATIONS

Office Action issued in U.S. Appl. No. 18/048,134, filed Oct. 24, 2023 (30 pages).

Office Action dated Jun. 7, 2023 issued in U.S. Appl. No. 18/048,134, 24 pgs.

Final Office Action issued in corresponding U.S. Appl. No. 18/048,134, filed Feb. 15, 2024 (24 pages).

ENTRYWAY SYSTEMS WITH VARIABLE LIGHT TRANSMISSION PANELS

CROSS-REFERENCE TO RELATED APPLICATION

This application claims priority benefit of U.S. provisional application No. 63/217,363, filed Jul. 1, 2021, the disclosures of which are incorporated herein by reference in their entireties.

FIELD OF THE INVENTION

The present invention relates to variable optical transmission elements which are used for building doors and windows, particularly in the entryway systems of buildings.

BACKGROUND

In building applications variable light-transmission (VLT) panels are located in windows for maximizing views, privacy, glare control, light through said windows, and enhancing building energy efficiency. This disclosure is directed to the use of such panels in building entryway systems including doors. Other applications which may also be enabled by the disclosure here are windows that, in part, physically open by manual or automatic sliding, tilting, pushing or rotating about the hinges, unless specifically mentioned otherwise. VLTPs have been used in some building windows, but their use in the entryway systems is not known, and in part it may be the integration of such panels in a variety of formats, sizes and ease of replacement, and also its function as a combination of utility and decorative aspects have been overlooked. Typically, these VLT panels (or optically variable panels) have large areas in excess of about 100 sq cm and some are as large as 16,000 sq cm and larger.

SUMMARY OF THE INVENTION

The use of glass in a building entryway is very important both from a functional aspect (such as energy reduction and light control) as discussed below and also imparts decorative/aesthetic aspects. This disclosure includes the use of VLT panels for such applications. The VLT panels typically use electrochromic and/or may also use liquid crystal technologies. The programmatic features are used to optimize device operating parameters based on data collected from sensors, to update user preferences/inputs, to interconnect with a building management system and to address any device characteristics that change with time or to communicate a physically broken or a malfunctioning device to the user/building management system/manufacturer. Some of the device characteristics that may change with time are its electrical resistance, electrical charge capacity, change in its electrochemical (redox) potentials, optical properties and electrical/optical response as a function of temperature. External parameters temperature, light, local weather conditions, or utility power capacity or other needs may also necessitate program changes. Thus, it is preferred to provide electrical power to these VLT panels using primary battery packs unless these VLT panels are powered using the main power supply of the building or secondary battery packs may also be connected to this power source.

Once VLT panels are connected to the building main power supply, the present disclosure includes integrating these VLT panels with other user-desired electronic features and control systems within a door system. This avoids the use of primary batteries as the only source of power, as these can periodically run out of power, and the devices become temporarily unswitchable.

For example, electronic door locks typically require electricity from a primary battery. When these batteries run out of power, a user can be locked out of a building. Therefore, there is a need to reduce occurrences of people inadvertently being locked out of buildings due to electronic door locks losing electrical power.

Thus, utilizing the electrical wiring of these VLT panels to connect and power one or more electronic devices located within a door system decreases reliance on batteries only for the electronic devices and enables use of additional devices in the door systems and reduces dependence on the limited capacity of batteries.

In one aspect, the present disclosure includes a building entryway system containing a variable light transmission panel (VLTP), wherein the VLTP is used in at least one of a doorlite, a sidelite, and a transom of the building entryway system, and wherein the VLTP changes optical transmission and color when an electric voltage is applied thereto, wherein the VLTP has a bleached state and a colored state, and wherein the color difference $\Delta E^*$ between the bleached state and the colored state is equal to or greater than 35.

In one aspect, the present disclosure includes a window of a building entryway system, the window comprising an electronic module and a VLTP that forms a partition between a first space located outside a building and a second space located inside the building, wherein the first space has an illumination level of $L_1$ in lux and the second space has an illumination level of $L_2$ in lux, and wherein the window is configured such that a privacy, P, of the first space through the VLTP from the second space is controlled by adjusting the visible transmission of the VLTP.

In one aspect, the present disclosure includes a variable transmission optical panel (VLTP) in a building entryway system, wherein the building entryway system comprises a frame and a movable element in which the VLTP is located, wherein the movable element is pivotable between a closed position and an open position, wherein electric voltage is connected to the VLTP when the movable element is in the closed position and electric voltage is disconnected from the VLTP when the movable element is in the open position.

Other features and characteristics of the subject matter of this disclosure, as well as the methods of operation, functions of related elements of structure and the combination of parts, and economies of manufacture, will become more apparent upon consideration of the following description and the appended claims, all of which form a part of this specification.

DETAILED DESCRIPTION

While aspects of the subject matter of the present disclosure may be embodied in a variety of forms, the following description is merely intended to disclose some of these forms as specific examples of the subject matter encompassed by the present disclosure. Accordingly, the subject matter of this disclosure is not intended to be limited to the forms or embodiments so described.

Figure 1:
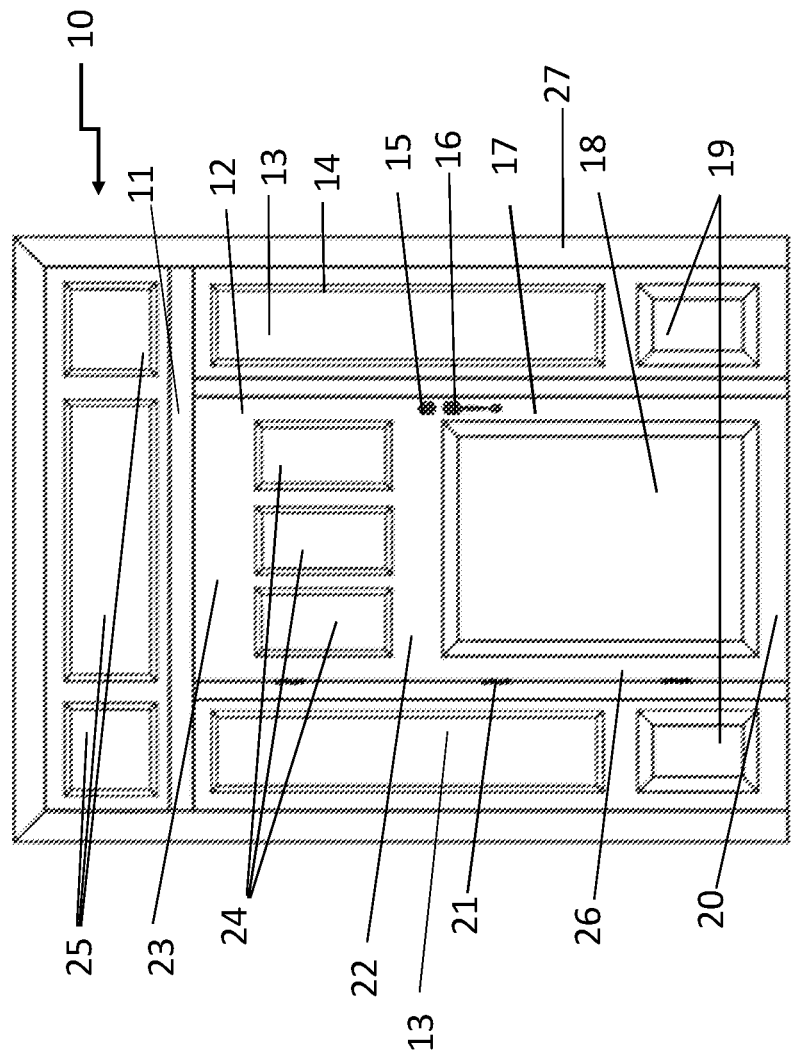
FIG. 1: Shows an anatomy of a front entry system, for example, in a residential setting.

FIG. 1 illustrates a general entryway system (or entrance system) which includes a door and several optional panels surrounding the door. The illustrated elements are as follows:

10 Entry way system
11 Mull cover
12 Shutting door stile
13 Sidelites
14 Sidelite frame
15 Door Lock
16 Door handle
17 Door
18 Door Panel
19 Side Panels
20 Bottom door rail
21 Door hinge
22 Middle door rail
23 Upper door rail
24 Doorlites
25 Transoms
26 Hanging stile
27 Door Frame The door system shows a door which has three glass doorlites 24 and a panel 18. The terms doorlite, sidelite and transom in the entryway system refers to glass constructions or glass panels, whereas the term door panel in the entryway system represents non-glass panels (e.g., wood, metal, etc.) FIG. 1 also shows hinges, a lock and a door-knob. On the left and right side of the door are sidelites 13 of glass and below the sidelights are side panels 19. The transoms 25 are also made of glass are shown at the top. While three transoms are shown, zero, one, two, or more than three transoms are also part of this disclosure. The side panels 19 and the door panel 18 may also be converted into one or more sidelites and/or doorlites when they are made of glass. There may be many variations to the door systems and thus the presence and number of transoms, doorlites, sidelites, side panels, hinges, locks, handles, and other components may be varied. For example, there may be no sidelites and only a transom. The door may have a doorlite 24 that extends nearly the entire length of the door area supported by the upper rail (23), bottom rail (20) and the two stiles (12 and 26) on the side. Thus, the middle rail 22 is also optional. The panel 18 in the door 17 may be replaced by glass. The doorlites 24 may be separate pieces of glass or the door 17 may include only one single doorlite and it may have a partitioned look by placing dividers within the single glass doorlite. Similarly, the sidelites 13 may be divided in several parts and may extend the entire door length. In some aspects, the side panels 19 below the sidelites 13 may also be replaced by glass as small sidelites. Similarly, the Transom 25 may be in three sections as shown or in one or two sections or even divided into more sections (or may be absent). The door system may only have one or more sidelites and no transoms, etc.

The present disclosure uses glass panels with variable light transmission in at least one of the elements in the entryway system such as doorlites, sidelites and transoms. These are particularly useful in residential applications. There may be several considerations in selecting glass panels for the door system other than the fact that natural light is desired and one can see through them to feel a part of the outdoors, the others relate to decorative function (aesthetics) for example color and opacity, privacy function and energy efficiency function, light control, and/or several of these functions combined. The entryway system also includes the electronics and connections to power and control the color and transmission of the VLTP panels (in doorlites, sidelites and transoms) and any associated electronic devices connected to the system as discussed below.

Typically, the energy efficiency of opaque building envelopes (walls, roofs/ceilings, doors, windows, etc.) is measured by R value, where R is the resistance of heat from one side (e.g., outside or inside) to the other (e.g., inside or outside) respectively. The lower value of R signifies low efficiency as heat can be easily conducted from one side to the other. The imperial units of R are (° F.-ft$^2$-hour)/Btu and the metric units are (° K m$^2$)/W. By multiplying the R value in imperial units by 0.176 one obtains the R value in metric units. Unless mentioned specifically, the units of R in this disclosure shall be in imperial units.

The R-value of a 1¾-inch wood door is 3.03. R-values increase with increasing thickness of the material. A 2¼-inch solid-core wooden door, for example, has an R-value of 3.70. For comparison with other materials, a 2-inch-thick metal door with a core composed of urethane foam insulation can have an R-value of 15. In most cases, insulated steel or fiberglass will have an R-value in a range of 5 to 7. As a comparison, a 6 mm thick glass (about ¼ inch) has a R value of 0.91. A double pane window with 12.5 mm gap filled with air has an R value of about 2.1, and if a low-e coating is incorporated on one of the substrates within the gap, the R value increases to about 3.

The window having a VLTP in the door may comprise an insulated glass unit (IGU), i.e., one of the panels of this IGU is a VLTP. An IGU is formed using two or three panels in parallel which are combined with a gap in the range of about 3 to 20 mm. These are typically edge sealed with a desiccant and the gap between them is filled with a gas, such as air, argon, krypton, or their mixtures, etc. In some cases, the gap may be evacuated, and in that case this gap is about 0.1 to 3 mm and it is supported by spacers or pillars throughout the panel area so that the normal air pressure outside of the IGU does not collapse this gap called vacuum insulated glazing. IGU panels have higher thermal and solar efficiency as compared to the single panel constructions. For the applications contemplated herein, the IGU construction will have one of the panels being a VLT panel and at least one of the surfaces of the panels comprising the IGU panel has a low-emissivity (low-e) coating or an adhesively bonded film, with an emissivity of less than about 0.2, and in other embodiments less than about 0.1. The VLT panels may be made using heat strengthened glass, tempered glass, or may be laminated using a pair of laminating films on either side of the VLT panels between a pair of transparent glass or plastic substrates to enhance strength to meet building code safety standards or ANSI Z97.1 impact standards. One of the glass panels within the window system (i.e., one of the panels in an insulated glass unit (IGU) or one of the panels used in the VLTP) may be completely transparent or frosted to any desired degree. In an alternative method, polymeric films may be bonded to the exterior surfaces of the VLT panels to enhance their strength to promote safety or contain broken pieces of glass, in case the panels break (for example polymeric films, e.g., 3M SH4CLARXL (safety and security 40) is available from 3M (St. Paul, MN). These panels may have various external reflected colors or internal transmitted colors. Said colors can be individually customized.

Thus, on one hand, it is preferred that when the focus is on energy savings, the IGUs used in the entryway systems with VLT panels should have a minimum value of R as 3. Since, 1¾ inch thick wooden doors are common, R value of IGU's in an entryway system should preferably be equal to or greater than 3 to ensure that energy efficiency of the building is not compromised by the use of VLTPs in the entryway systems. This means the use of these energy efficient VLTPs in doorlites, sidelites and in transoms. In these IGU's at least one of the panels is a variable transmission panel (which may be further laminated for safety and/or UV protection), which to form an IGU is assembled with second pane separated by a gap. The second pane is either tempered or laminated for enhanced safety. One may also use two VLTPs separated by a gap to form an IGU, where each of them is controlled independently to get a large optical modulation range. Usually, the R values stated above are measured in the center of the glass.

Another aspect of use of VLTP panels in the entryway systems, particularly for residential applications is to enhance the decorative and light control value. In many instances colored glass is used in all or part of the entryway system (e.g., as a pattern) to enhance the visual appeal. The addition of VLTP panels allows one to change the appearance of the entryway. The VLTP panels may be only used in all or part of the total glass panels used in the entryway. These VLTPs may be controlled separately to provide a different look as desired by the user. For this case, the VLTP panel used in the building must show a large visual change in its bleached (non-colored state) and the colored state. This visual change may be quantitively measured by the transmitted light. Further, the VLTP panels may be programmed to automatically cycle between a colored and bleached mode to constantly change the color pattern in the entry way system to signal or to celebrate an event. In some instances, patterns may be put in each of the VLTP panels so that only those change color. This is done by pixelating the transparent conductor, and addressing these pixels individually or as a set for creating patterns or text.

Color (or appearance) of the VLTP (or a window having a VLTP element) is established by measuring transmitted light using color coordinates. VLTPs may also be laminated using colored polymeric films or glass with different colors or reflective coatings for color customization and privacy, as discussed later. There are several color coordinate systems used to measure color which are mathematically related. A commonly used three-coordinate system called "L* a* b*" will be used to explain this. The color difference in transmission $\Delta E^*$ between two different optical states of a VLTP is established by measuring the color in each state and expressing that in "L* a* b*" system. This is done by measuring the coordinates of the light being transmitted when it is in the bleached state ($L_1^*$, $a_1^*$ and $b_1^*$) and again when it is in the colored state, that is $L_2^*$, $a_2^*$ and $b_2^*$. Using this color system of coordinates, the difference in the color between the two optical states $\Delta E^*$ is computed as given below.

$$\Delta E^*\text{Sqrt}\{(L_2^*-L_1^*)^2+(a_2^*-a_1^*)^2+(b_2^*-b_1^*)^2\} \quad \text{(Equation 1)}$$

In order to have a large change in color in transmission, $\Delta E^*$ should be greater than 35. This may be measured on the VLTP alone or an insulated glass unit containing a VLTP as described below, that is whatever product is used in the entryway system. Frosted glass may also be used as one of the substrates in making the VLTP and/or in an IGU may be fabricated with frosted glass as a second pane. Use of frosted glass can add privacy (although see through view is compromised), in addition to the decorative function and enhanced energy efficiency as discussed below. The frosted glass generally has an optical haze greater than about 30%. In aspects where the VLTP exhibits many colors or shades depending on the magnitude of the voltage/power applied, then at least in one of the colored states, the above color difference will hold as compared to the bleached state. When frosted glass is used as a second pane, the frosted side of the glass can face inside the building and the other side facing the IGU gap may have a low-e coating so that it also provides the benefit of increased energy efficiency as well.

Figure 2:
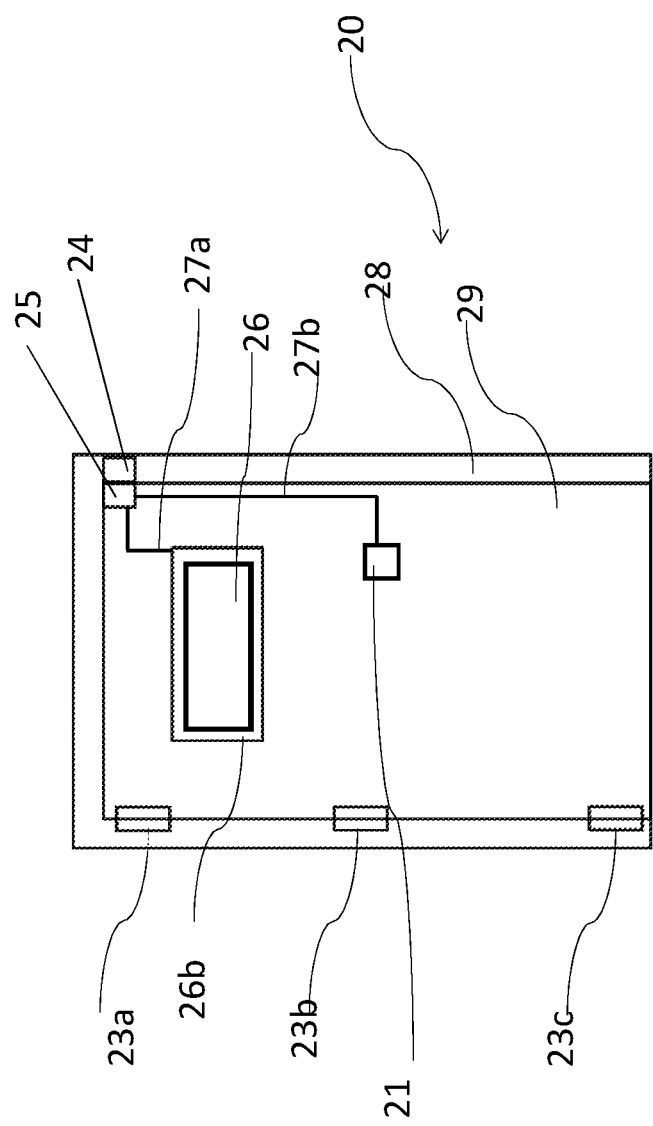
FIG. 2: Illustrates a front view of a building door system according to some embodiments.

FIG. 2 illustrates a front view of a building door 20 including a door 29, window 26, and door hinges 23a, 23b and 23c. The sidelights and the transom are not shown, however if they are present, they may also have VLTP, and be powered by the same power supply that powers the VLTP panels in the door or may have a different power supply. The window containing a VLTP located in the door is shown as 26 and 26b is a bead (a frame or four sides of a frame that seamlessly fit together), which helps to hold the VLTP in place and covers its edges which may have electrical connections, sealants, etc. The window 26 in the door comprises a VLT panel (also referred to as reference 26). The VLT panel in the door is connected with an electric cable 27a to the power supply 25 (or called VLTP power supply or an "electronic module" as this has many other functions as discussed later). The power supply 25 located in the door is connected to the input power from the mains 24 which is located in the non-movable part, the door jamb structure 28 or somewhere inside the walls, preferably in proximity to the entryway area. Also shown in this figure is an optional electronic device 21, which is connected to the power supply 25 by an optional electrical cable 27b. A door system may be used in any suitable location, for example to divide interior rooms, or as an exterior entry or side door to the building or other structure.

In addition, foam or other flexible gaskets are used around the perimeter of the VLTP panels to protect them from shock as the doors and windows are opened and closed repeatedly against hard stops, and also to improve weatherization, that is to minimize any exchange of inside and outside air from the perimeter area of these panels and the frames they are in, to preserve high energy efficiency. It is preferred that these materials are removable or are adhesively bonded to only one of the panel or the frame in which these VLTP panels are incorporated into so that these panels and/or the foams/gaskets are easy to remove for replacement if desired. The channels and/or the holes in the doors (54 and 55 respectively in FIG. 5), and window jambs (hinge or strike jambs), casings, etc. to carry the electrical wires may also be lined or insulated with thermal insulating tapes to ensure that the insulation properties of doors are not compromised due to the presence of these holes and channels. This also includes channels and holes in casings and sashes, etc., for transoms and sidelights which are used in buildings and are generally associated with the front entry-way systems.

Figure 3:
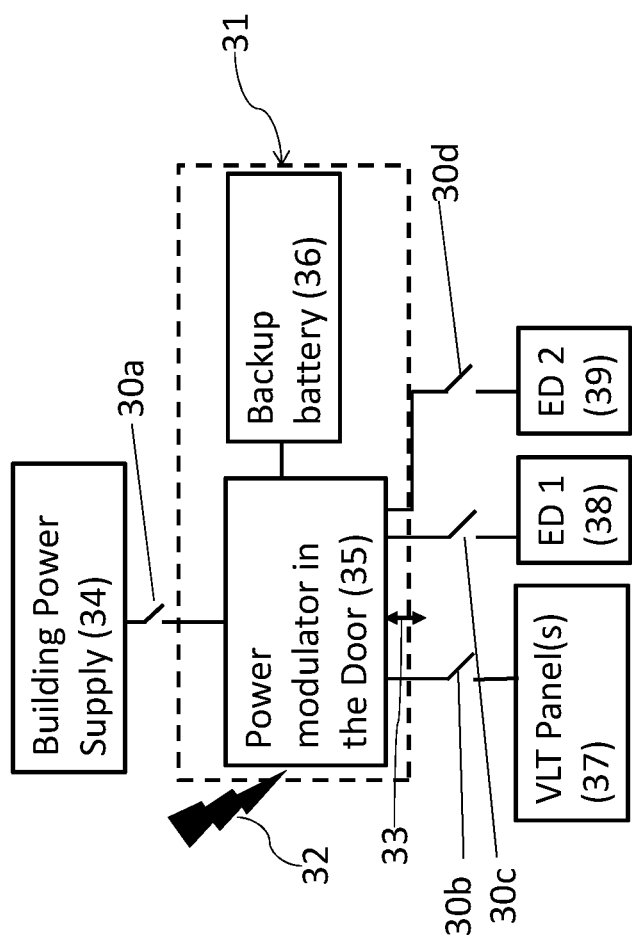
FIG. 3: Illustrates a schematic representation of a power supply/controller system integration with building power supply, VLTP and other components.

FIG. 3 shows a general schematic of the powering and control system integration. The main building power supply (34) connects to the electronic module (31) (or VLTP power supply) located in the door. Although not shown in this figure, this module may be located outside the door and in the vicinity of the entryway system. In case the electronic module is not always connected to the VLTP (such as through wired hinges), this power connection may be wireless (inductive) or through receptacle/pins (e.g., the retractable pins may be spring loaded) in the door which connect when the door is in a closed position. This electronic module (31) has many functions and may also have an optional backup battery module (typically a secondary (rechargeable)

battery) shown as 36 or the battery pack is a separate entity in which case the electronic module 31 and the power modulator 35 are the same. The battery may be used to supply power when there is a disconnection, disruption or failure of the building power supply. Electronic module 31 also provides/modulates or conditions/distributes power to any number of VLT panels located in the door along with the other electronic devices present in this door. Only one VLT panel (37) and two electronic devices 38 and 39 are shown, but there is no limitation on the numbers of VLTPs and EDs that may be used in a system according to the present disclosure and the representative VLTP and EDs in FIG. 2 are for exemplary and illustrative purposes only and do not limit the disclosed invention. This module not only provides power, but also collects any feedback necessary from the controlled devices (including VLTs) to adjust the power or to activate certain features in those devices. In some cases module 31 continues to power other electronic devices (ED 1 (38), ED 2 (39), . . . ) even when the VLTs are not being powered in that situation. It is to be noted that ED 1, ED 2, etc., are not VLTP panels. Also, more than one electronic device may be connected in series, where a first of these EDs is connected to the electronic module 31. Electronic module 31 is also capable of communication, e.g., wireless communication (shown as 32) with external devices and systems, which may include user inputs and applications, home energy management system communications, control of lights external to the door system, weather, sun position relative to the door, time, status of the VLT (37) or the electronic devices (38, 39, . . . ), battery (36) status, etc. In one embodiment, if one or more of the VLTP breaks due to an impact or burglary, then its electrical characteristics would change and can also be communicated to an external device, and may be tied to an alarm system, camera(s), security center(s), or any other receiver. An electronic device according to the present disclosure may be a motion sensor, which when sensing an outside motion could trigger a privacy mode by darkening the VLTP panel, e.g., during the daytime, and at night (or during periods of darkness) could trigger turning on lights, e.g., as discussed further below. This system may also be tied to a camera system, e.g., located in or proximal to the door, which could take an image or video, and store and/or transmit the image or video to an external storage or display device. Also shown in this diagram are four switches 30a, 30b, 30c and 30d. These switches are optional. In one embodiment switch 30a is in open position when the door opens. Switches 30b, 30c and 30d may be automatically opened or closed depending on their functions or these may be put in particular positions by the user manually or remotely. Also, in one embodiment, one or more electronic devices are integrated within the electronic module 31. In another embodiment, the electronic module 31 supplies power to one or more electronic devices and the power to the VLTP panel is routed through a connection present in at least one of these electronic devices.

Non-limiting examples of electronic devices includes, but is not limited to so-called 'smart home' and other electronic devices listed below. These include smart (electronic) locks, doorbell cameras, visual devices (displays, optical indicators- e.g., LED lights), doorbell chime, and other audible indicators and alarms, video interfaces, audio interfaces, antenna range-extenders, digital thermometers, burglar alarm, burglar sensor, humidity sensors, pressure sensors, wind sensors, door open/shut sensor, audible noise generators. panic buttons, smart lighting (either on or adjacent to the door system such as a porch or step light), motion sensors, cameras, cameras tied to motion sensors, wi-fi bridge, transformer, data storage devices, smoke alarm, door close/shut alarm and indicators, electronic light switch, speaker, electrical outlet, or an electrical receptacle (jack) including, but not limited to, for example, a USB 2.0, Micro USB, Mini USB, 8 pin lightening, or USB C. The electronic device can have a port capable of plugging in to these said electrical receptacles. Some of these electronic devices may also provide input into the desired optical state of the VLTP panel, which then changes accordingly unless overridden by the user. For example, in one embodiment, the ringing of the doorbell may activate a coloring bleaching sequence of these windows. This may be of use for hearing impaired. In another embodiment, a glass break (loss of electrical component, i.e., VLTP) in one of the entryway systems may be an indication of a burglar.

Another example of an electronic device (which may be a software or an electronic function) includes a remote electronic device controlled and activated by the location of a third party. This device delivers a wireless signal to darken the VLTP panel when said device is within a certain proximity of the front entryway system. The device such as a phone, watch, or fob or similar medium may be controlled automatically or manually, and may also be integrated with the delivery software of the third party. Examples of third parties may include taxi or delivery services, package delivery companies such as Amazon, DHL, UPS, FedEx, the US Postal Service or a food delivery company such as Uber Eats or Doordash. The purpose of such connection is to provide a safety feature to an entryway system to increase the privacy of the front entryway system for a building occupant or owner as the third party delivery company approaches the building. This electronic device is called "third party activation", and may use other electronic devices integrated into the system, such as communication with a cellular system, camera and others.

When multiple VLTs are used in the door, then each of the VLTs may be connected to the module 31 separately and controlled individually, or all of these may be connected in parallel to one output. This electronic module 31 also includes inputs/outputs (33). While the inputs/outputs are represented as (33), multiple inputs/outputs may be included and these may be wired or wireless. Such connections may be used to connect additional devices at any time, which may be done during installation of the VLTPs or at a later. The wired connections may be made in any way including USB 2.0, Micro USB, Mini USB, 8 pin lightening, or USB C, etc. The communication of the electronic module with the electronic devices may be through these wired ports or wireless (blue-tooth, WiFi and near-field communication protocols). In one aspect, unit 31 is located in a housing (not shown) which is easy to disconnect for maintenance or replacement.

Figure 4:
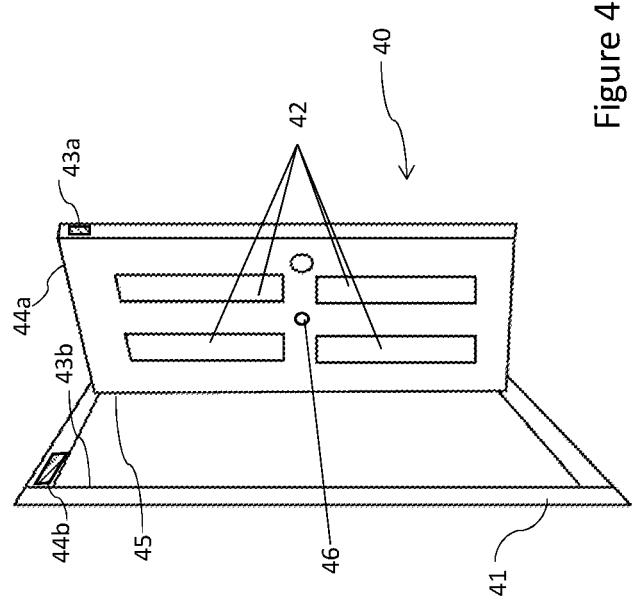
FIG. 4: Illustrates a view of a building door system according to some embodiments.

FIG. 4 shows a door 40 and a door casing (frame) 41 that may be affixed to a building structure. Four VLT windows (42) and an electronic device 46 are shown. In this case, the electronic module 31 shown in FIG. 3 is located in the door. However, if this coupling is wireless, and/or it needs to be removed and replaced for easy accessibility, it should be close to the surface of an edge, and several locations on the door are preferable. For example, an electronic module may be located as shown as 43a in a cavity within the door which is easily accessible and the main building supply is located in the casing (frame) adjacent to 43a when the door is closed in a position indicated by 43b. In this case, it is preferred that for safety of children these locations be at about 150 cm or above from the floor, and in another embodiment this distance should be about 180 cm above the floor. Another optional location for the electronic module is on the top of the door in a cavity as shown by position 44a and adjacent to a cavity (when the door is closed) in the casing where the main building supply 44b is shown. Another position in the door is to locate this close to the hinge area as shown by 45 as an example. These could be connected wirelessly by inductive coupling or physical connection, e.g., using retractable/spring loaded prongs. As discussed above, for physical connection, wires from the building power supply can also be routed through the hinges. Wired hinges are commercially available, e.g., McKinney TA2714QC8 (from Amazon inc., Seattle, WA). This particular hinge has eight wires (4 pairs), and at least one or more EC panels may be connected to at least one pair, and the other pairs may be used for other EC panels or to the electronic features in the door. Since a door has many hinges (typically 3 to 5), one may use only one or more hinges that are wired. In this case the electronic module may be located in close proximity to the entryway system, e.g., in a wall, baseboard, etc., In this figure, connections from the door module to the various devices are not shown, but a person skilled in the art reading this disclosure will understand how to make such connections. In another embodiment, for safety reasons, the voltage transmitted from the power supply to inside the door does not exceed 50V, in another embodiment this is limited to 12V and yet in another embodiment this is limited to 5V.

Further, for this application it is important that the VLTPs are easily serviceable and/or replaceable. Further, it is common in residential buildings to retrofit different types of entryway systems (e.g., a different door which call on for different sized and number of VLTPs, or simply a VLTP with a different color).

Figure 5:
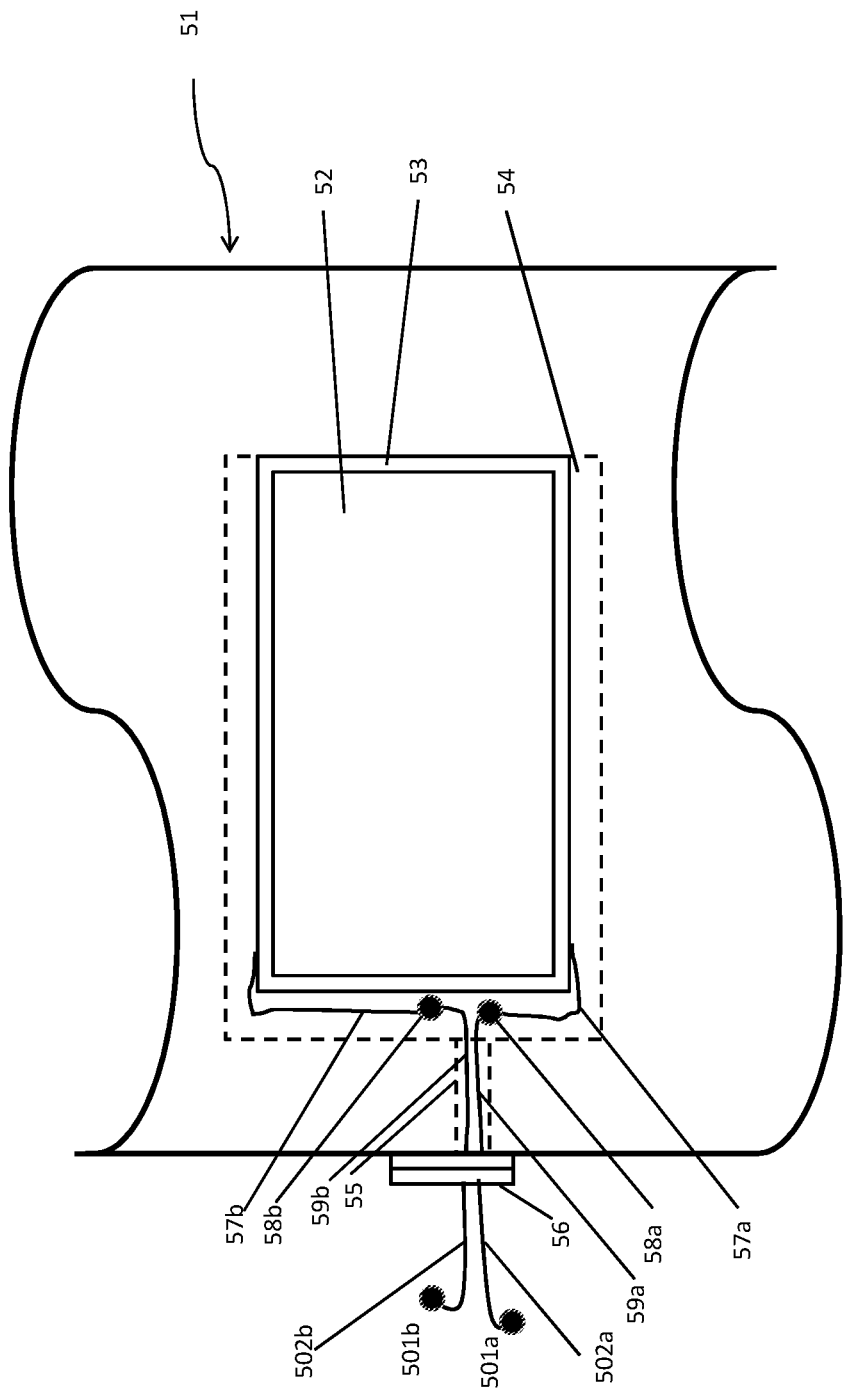
FIG. 5: Shows a partial schematic view of a door with a VLTP and a hinge.

FIG. 5 shows a cutout of a door 51 with a VLTP 52 and a bead 53 along the perimeter. The bead 53 may be raised from the door 51 surface or be flush. The hinge 56 is wired and the power is routed through hinge 56 into a hole 55, which is connected to channel 54. Channel 54 is hidden in the door 51 and may extend along sides of the VLTP 52, e.g., on one, two, three, or four sides thereof. In some aspects, channel 54 may be U-shaped channel that opens into the door cavity where the VLTP 52 is placed. It is through this channel 54 where the wires 57a and 57b are routed and a quick disconnect (e.g., a wiring nut) is placed as shown by 58a and 58b. The width of this channel is about 1 cm wide (usually less than the thickness of the VLTP or the IGU) for routing the wires from the VLTP. Typically, the quick disconnect is located in the vertical part of this channel 54. The wires 59a and 59b from this disconnect are then routed through this channel 54 then through a connected hole 55 to the hinge 56 area. In one embodiment there may be another disconnect to connect to the hinge wires, or as shown, the hinge wires are long enough to be connected to 59a and 59b. The term "hinge wire" refers to the set of wires coming out from both sides of the hinge as procured and are internally connected. One set of wires protrudes from the first side to make electrical connections to the VLTPs and the electronic devices located in the door. The wires from the second side are connected to the power supply and control unit or other electronic devices which are not part of the door (even though they may be used in the entryway system). The wires in FIGS. 5, 502a and 502b; and 59a and 59b are referred to as the hinge wires, where the former set is connected on the second side and the latter set on the first side. The hinge 56 is wired, and the wires through the hinge 56 are not shown but the wires 502a and 502b coming out from the other side of the hinge are routed through the door jamb (not shown). There may be another set of disconnects 501a and 501b to connect it to the electronic module exemplified in FIG. 3. These disconnects 501a and 501b ensure that, if an EC window has to be replaced, then the wiring from the door does not need any rewiring, and similarly the power supply may be replaced without requiring extensive rewiring. The bead 53 is so constructed and attached so that it is easy to remove, as this will allow easy replacement of the VLTP by rapidly disconnecting it electrically from the quick disconnects discussed above and lifting off the VLTP for replacement. The bead 53 is usually on one side, typically inside so that it is easier to take the window 52 out from inside and not outside. The outside may have a door cut only showing the window area or a permanently fixed bead that is not easy to remove to ensure security. The depiction in FIG. 5 applies to one or more doorlites, one or more sidelites, and/or one or more transoms of door, except the hinge may optionally be absent in the case of a transom or a sidelite. The doorlites, sidelites and the transoms may all be electrically connected together in electric parallel to a single channel or multiple channels using one or more controllers, e.g., as depicted in FIG. 3. In one preferred embodiment, if any of the VLTP panels malfunctions, deteriorates, breaks, or develops an electrical short, that problematic VLTP is automatically isolated and the other entryway VLTPs remain functional.

The optically variable transmission panels may be formed using an electrochromic or liquid-crystal technology that show a color change as discussed herein. The present disclosure also includes use of polymer dispersed liquid crystal (PDLC) panel(s), which change from clear to opaque and may be combined in an IGU configuration with an EC panel that changes color, i.e., one panel in the IGU is liquid crystal panel which does not undergo a color change (even though it may become opaque upon switching), and the second panel is an EC device that changes color. In some aspects, these are large area panels, where their size may be, for example, 100 sq cm or larger in one embodiment, and larger than 200 sq cm in another embodiment, and larger than 16,000 sq. cm for some applications. A door or a window may comprise one or several of these panels. The entirety of the variable panel may change its optical transmission, or these may be patterned so that only selected area with the panel may have that property, or some areas may change to a different color. The VLT window may be bird-friendly glass, e.g., one or more of the panels can have a pattern that is visible/sensed by birds.

The above panels have to be powered and their optical transmission controlled as desired by the user or required per device pre-programmed kinetic parameters. Since these doors physically open and close, it is desired to provide electrical connections from the main building which are long lasting, do not fatigue and are also easy to maintain. Some of these doors and windows are mounted on hinges connecting the door (a) vertically between the door frame and the top and bottom rails or (b) horizontally between the door frame and the door stile. Or, these doors may slide, or pop-open manually or through a programmatic automated control. In one method for doors, which open by rotation movement around hinges, wired hinges are used which are discussed above.

In another method according to the present disclosure, the power is supplied by induction or conduction only when the door is in the closed position. In the latter, the power supply is brought to the fixed-frame of the door that has a first interface and it engages with another interface (second interface) located on the movable portion of the door to form an electric connection between the two, when this door is in the closed position. These could be the sides of the lock side stiles or the hinge side stiles in a door/window which when closed come in the close proximity of the frame. The close proximity is defined from touching (without forming a conductive connection) to 10 cm. In another variation the power is brought to the fixed-frame or in its vicinity such as a door jamb to an adapter that wirelessly couples to another adapter located on the movable door/window when the said door/window is in the closed position. This could be an inductive coupling as used in wireless cell-phone charging. In both of the above there is no power transmission when the door is in the open position. In another embodiment power is provided through the wired hinges as discussed earlier so that there is no interruption of power when the door is in the open position.

Further, the VLT devices are rarely powered using the voltage supplied by the building, the power has to be conditioned, e.g., converted to a low voltage DC supply for electrochromic panels (typically in the range of ±5V), and for the liquid crystal panels it may require a step down in voltage to a range of 20 to 100V AC, and may even require a frequency conversion in a range of 50 to 400 Hz with a change in the waveform. Further, there may be other nuances in the power supply, such as for EC devices applying a ramp or a step potential during coloring (darkening of the panel) or bleaching (lightening of the panel to a more transmissive state), and maintaining an intermittent powering during a period where a certain optical state is maintained. The electronic devices may have different power requirements as compared to the VLTPs and amongst each other, and also communication with each electronic device could be different and may require communication with a control system as mentioned before. In another embodiment, the power modulator 35 or electronic module 31 may also be located outside of the movable door or window and the devices in the door may be connected by cables using interfaces which are similar to the wired alternatives between the main building power supply and the module 31. Electrochromic panels typically require ±5V DC, and other devices may have different AC or DC powering requirements (e.g., if any PDLC panels are used). In another embodiment, the module 31 may also be located in the fixed part of the building where the power to the door is transmitted through a multi-pin connector for each of the devices, and then power would also be turned-off to all of these devices when the door is in an open position, unless there are dedicated battery based power supplies to certain electronic devices. This power supply may also power the transom and the sidelights if these have VLTPs.

Control of the panel, that is when to apply the power, how to electronically monitor the glass, and the details of powering during coloration, bleach and during maintenance of the optical state, are determined by the control electronics. The electronic module may receive instructions to change its optical state via a user interface or it may be through one or more sensors that also feed into this electronic module where a decision is made to trigger an event for the VLT panels to change their transmission. The control-electronics may be a separate box or housed within the confines of the power conditioner. The module 31 in FIG. 3 includes all of the above elements, other than any control or input that emanates from outside of the door. For easy maintenance, it is highly desired that these be located so that these are easy to access and remove and then replace or repair in the event these components are not operating to existing or future upgraded standards.

In another aspect, a rechargeable battery or a supercapacitor can be integrated to provide power to the VLT panels and the control panel, and/or other electronic components which have to be powered. The battery may be charged all the time or at pre-selected duration when the power-load on the grid is low. A solar panel may also be integrated in the entryway for a power-source. Although not shown in FIG. 3, the solar cell may be connected to power modulator 35 and/or the electronic module (31). The incoming power from the solar cell and the building mains will be modulated so as to minimize the use of the power from the building mains.

When there are several panels in a door or a window which have VLT properties (individual EC cells), these may be powered by a common power-conditioner by using a set of parallel cables connecting all of the individual cells, or separate cables may be used from the power-conditioner to connect each panel. The latter has the advantage of powering and even controlling each panel separately so that in case one of the panels develops an electrical short or experiences a problem, then that issue can be isolated only to that panel, or the panels could be colored differently from each other. In such aspects, each building element that opens, whether it is a door, or a window will have its own power-conditioner and a signal-panel. The wires to the panels may be routed through cavities or channels in the rails, mullions, stiles, or other solid dividers. When wired hinges are used, a hole or a channel running horizontally from where the wires come out of the hinge runs into the vertical stile of the door to meet the vertical channel or holes from where the wires are routed to the EC panels and other electronic devices. In one embodiment, there are channels next to the VLTP panels to run the wiring system and have easy access. The wires from the VLTP panels may be connected to the wires leading to the power supply (e.g., through the hinges) in the above-mentioned channels using quick disconnects (e.g., wirenuts) so that it is easy to remove and replace these panels without having to change the entire wiring assembly.

The transmissivity of the VLT panels may be changed automatically via desired algorithms and input from the sensors as discussed below or by user overrides through an appropriate interface. The user-interface may be a switch on the wall or on the door, which the users activate when the optical transmission has to be changed, which communicates wirelessly to the control panel or is hard wired through the same interface by which power to the door is provided. Other user interfaces may include an electronic communication device, e.g., a smart phone, smart watch, smart wearable device, a remote used to control TV and/or other appliances, home automation systems including but not limited to Amazon's Echo® and Alexa® devices, Google's Google Home and Apple's HomePods, or other remote human machine interfaces, such as a home-to-smart electrical grid interconnection, automobile, or other remote control programmable interfaces.

Control may be done in many ways and these may also be overridden by the user (for example a building occupant or custodian). One important aspect of VLT windows is to allow the light to come in and also be able to enjoy the outside views, but also be able to preserve the indoor privacy. As discussed below, privacy of a transmissive panel will depend on several factors, including the optical properties of this VLT panel and the light intensity (or illumination level) outside of the door/window, optical glare from the sun and the illumination level inside the area partitioned by this door/window. This would mean that for a given transmissive panel, privacy will also be determined by outdoor lighting conditions and indoor illumination.

An optical element with a certain visible reflectivity of the light from outside ("R") and visible transmissivity of the light from the indoor to the outside ("T") can have a privacy "P" defined based on the inside illumination level ($L_1$) and the external illumination levels ($L_E$) as $$P=(R \times L_e)/(T \times L_1) \quad \text{(Equation 2)}$$

When "P" equals or exceeds 5, it is difficult for a person standing outside to see the image clearly of the interior, which means that the glass provides privacy. This is particularly important when it is dark outside of the building, e.g., at night. Nighttime or a dark outside environment is defined when the solar illumination outdoors falls below 10 Lux. Since the "T" of a variable transmission glass can be reduced more substantially as compared to the changes in "R". In addition, the EC glass panel may be designed with higher visible reflectivity, e.g., R>15% in one embodiment and >20% in another embodiment. In the above equation both R and T are expressed in percentage as compared to air and $L_1$ and $L_E$ in lux. Both R and T may focus on photopic visible transmission (or at 550 nm) or scotopic visible transmission (or at 500 nm). For example, see U.S. Pat. No. 11,287,717 (entitled: Variable Light Transmission Structures with Improved Optical Properties) for use of interference stacks below the transparent conductive coatings to increase the reflectivity of the glass, which is incorporated herein by reference in its entirety. Thus, by controlling the light outside the building during nighttime by an artificial illumination source and reducing the transmission of the interior light by changing the "T" value of the EC panel, in addition, it would be easy to create a light flux of an intensity $L_e$ so that for a given $L_i$, privacy is maintained, e.g., privacy of the interior is maintained when viewed from the exterior of the building. The above is not only true from external to internal, but also between any two portioned places space 1 and space 2, where privacy is maintained from a person standing near the window in space 1 and looking into space 2 through this window. In that case, illumination in space 1, can be denoted by $L_1$, and for space 2 it would be $L_2$. In the above equation, $L_i=L_2$ and $L_e=L_1$. Alternatively, the door has sensors (or has access to sensor inputs located near the door which can determine the outside light illumination level (on one side of the closed door) and the inside light illumination (the other side of the closed door). Depending on the differential or ratios of these illumination levels, the optical panels may be darkened appropriately so that indoor privacy is obtained. In one specific case during the nighttime if the external illumination is the same as internal illumination (i.e., $L_e$ and $L_i$ are the same), then external reflectivity R>5×T to achieve privacy according to the above equation. In case the external illumination is half as intense as the internal illumination, then to achieve privacy R>10×T.

Since the transmission of these VLTP can be changed, in one embodiment at nighttime, illumination (or light) sensors located on the outside and the inside of the window (openable or not) would trigger an illumination change of outside (or outside and the inside lights depending on the setting desired by the user) while also changing the light transmission of the VLTP so that privacy from the outside to the inside is automatically restored. With illumination conditions changing on the inside for example, a privacy mode setting would automatically adjust the light transmission properties of the VLTP and e.g., also the outdoor illumination to maintain privacy (e.g., a porch light, or lights located at the outside perimeter of the building) when there is a change in indoor or solar illumination. In addition, in one embodiment, VLTP panels with visible outdoor reflectivity of greater than 15% in the clear or fully darkened states are preferred so that it is more effective to maintain the privacy from the outside to the inside. In another embodiment the visible reflectivity of 20% or more is desired. The electronic module discussed above is used to trigger the change in the VLTP panel and the light. The light intensity sensors may be an electronic device located in the door. It is to be noted that when these light sensors trigger an illumination source then a feedback loop will be provided to the electronic module to ensure that this illumination is not turned-off prematurely.

To enhance the utility of these VLTPs, they may also be laminated to additional glass sheets using polymeric interlayer sheets (e.g., poly vinyl butyral sheets in a thickness range of about 0.7 mm to 3 mm) which can provide additional safety against breakage and/or wind loads, and depending on the grade of the material will also reduce transmission of noise and vibrations from being transmitted from outside to the inside of the building or vice-versa. For example, S-Lec 0.76 mm thick sound acoustic PVB film (from Sekisui North America, Winchester, KY) can achieve this.

The present disclosure also includes the following aspects:

1. A method of electrically powering a variable light transmission panel (VLTP) located in a door or a window, wherein the said door or window comprises a stationary frame that is installed in a building, and a movable element that can be mechanically moved between a closed position and an open position and the said movable element contains the VLTP, wherein the method further comprises: connecting electric power to the VLTP when the said movable element of the door or the window is in the closed position; disconnecting the electric power to the said VLTP when the said movable element of the door or the window is in the open position.

2. The method of aspect 1, wherein said VLTP is an electrochromic element.

3. The method of aspect 1, wherein said VLTP of aspect 1 is assembled with another clear panel as an insulated glazing unit prior to its incorporation into the said door or the window.

4. The method of aspect 1, wherein a terminal for electric power supply of the building is located on the stationary frame, and the said VLTP connects with the said electric power supply through an electronic module.

5. The method of aspect 4, wherein the said electronic module and the building electric power supply are connected through a wired or wireless connection.

6. The method of aspect 5, where the connection is wireless comprising inductive coupling.

7. The method in aspect 1, wherein a user interface or a control system is connected wirelessly to at least one of an electronic module or through a wire to a module located in the door frame.

8. The method of aspect 4, wherein the electronic module is connected to a battery.

9. The method of aspect 4, wherein the electronic module is connected to at least one electronic device which is not a VLTP panel.

10. A user interface or a control system connected wirelessly to at least one of the electronic module and the said electric power supply of aspect 1.

11. The method as in aspect 1, further comprising one or more electronic devices which are not VLTP panels.

12. A smart window comprising an electronic module and a VLTP element that partitions two spaces into a first space and a second space, and wherein the first space has an illumination level of L1 and the second space has an illumination level of L2, and wherein the smart window is configured such that a privacy, P, of the first space through the said VLTP from the second space is controlled by adjusting the illumination between the two spaces relative to each other and the visible transmission of the VLTP, such that a value of P≥5 according to P=(R* L2)/(T*L1), where R is visible reflectivity of the VLTP in the second space, and T is visible transmission of the VLTP.

13. The smart window of aspect 12, where the illumination level of the first space relative to the illumination level of the second space and the transmission of the VLTP are controlled automatically by a control system of the smart window.

14. The smart window of aspect 13, wherein the control system is configured to communicate with a light source in the first space or the second space to increase or decrease the amount of light output by the light source.

15. The smart window of aspect 14, wherein the control system is configured to control transmission of light through the VLTP.

16. The smart window of aspect 12, further comprising one or more of a battery, a super-capacitor, and/or a solar panel.

17. The smart window of aspect 12, wherein the smart window is integrated into a door.

18. A variable transmission optical panel (VLTP) located in a building door or window, wherein the said building door or window comprises a frame that is installed in a building, and a movable element that can be mechanically moved between a closed position and an open position and the said movable element contains the VLTP and at least one electronic device, further comprising:
an electronic module connected to an electric power supply of the building to receive electric power and provide electric power to the VLTP and the said electronic device;
wherein the electric power from the building electric power supply to the electronic module is connected when the said movable element of the building door or window is in the closed position and is disconnected from the building electric power supply when the said movable element is in the open position.

19. The VLTP of aspect 18, wherein the electronic module comprises a rechargeable battery to provide power to the said at least one electronic device when the movable element is in the open position.

20. The VLTP of aspect 18, wherein the VLTP panel is not powered when the movable element is in the open position.

21. The VLTP of aspect 18, wherein the at least one electronic device comprises at least one of an electronic lock, a light, a visual device, a doorbell chime, an audible indicator, an alarm, a video interface, an audio interface, an antenna range-extender, a digital thermometer, a panic button, smart lighting, a motion sensor, a camera, a wi-fi bridge, a transformer, a smoke alarm, a door close/shut alarm and indicator, an electronic light switch, a speaker, an electrical outlet, and an electrical receptacle.

22. The VLTP of aspect 18, wherein said electronic module is configured to wirelessly connect to the building electronic supply.

23. A variable transmission optical panel (VLTP) located in building door or a window, wherein the said building door or window comprises a stationary frame that is installed in a building, and a movable element that can be mechanically moved between a closed position and an open position partitioning first and second spaces on each side of the movable element; and an electronic module which controls the transmission of the said VLTP and at least the output intensity of a light located in one of the said first and second spaces, so as to provide privacy through the VLTP when viewed from the space having the said light, wherein the said movable element contains the said VLTP and at least one electronic module and at least one electronic device, wherein: the electronic module connects to an electric power supply of the building to receive power and provides electric power to the VLTP and the said electronic device; and wherein power from the electric power supply of the building to the electronic module is connected when the said movable element of the door or the window is in the closed position and is disconnected when the said movable element is in the open position.

The foregoing description of the invention has been presented for purposes of illustration and description and is not intended to be exhaustive or to limit the invention to the precise form disclosed, and obviously, many modifications and variations are possible considering the above teaching. The embodiments were chosen and described to best explain the principles of the invention and its practical application to thereby enable others skilled in the art to best utilize the invention in various embodiments and with various modifications as are suited to the use contemplated. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

EXAMPLES

Example 1

Two electrochromic panels (or cells) were made and evaluated for their properties so that they were suitable for the entryway system and showed a large color difference. For purposes of this example, these were made using two glass pieces each 2.2 mm thick and separated by a 0.3 mm thick electrolytic layer. Their properties are shown in Table 1. These panels were colored by applying a voltage of 1.3V and Cell 1 colored to a deep blue color, and Cell 2 colored to a brownish/grey color. Their transmission at 550 nm and color coordinates of the cells in bleached and colored states are also shown. All color, transmission and haze measurements were made using Ultrascan Pro instrument from Hunterlab (Reston, VA).

TABLE 1

| EC Cell | % T at 550 nm | L* | a* | b* | ΔE* |
|---|---|---|---|---|---|
| Cell 1, bleached | 79.5 | 90.46 | −1.95 | 10.17 | 57.9 |
| Cell 1, colored | 3.0 | 34.43 | 3.38 | −53.28 | |
| Cell 2, bleached | 76.6 | 89.8 | −1.61 | 3.62 | 65.5 |
| Cell 2, colored | 8.0 | 24.91 | 3.69 | 4.33 | |

The color difference ΔE* between the colored and bleached state was calculated as shown in Equation 1. As seen the color difference in the two states is more than 35. These panels did not have notable optical haze, i.e., about or less than 1% haze.

Example 2

The same two VLTP panels were combined with 3.2 mm thick TEC10 glass (TEC 10 has a low-e coating on its surface) to form an IGU where the low-e coating faced the gap, which was 0.25 inches. The gap was filled with air. The transmission and the colors for these IGUs are shown in Table 2. All of these IGUs had negligible optical haze in all optical states between 0.9 and 1.25%.

TABLE 2

| IGU | % T at 550 nm | L* | a* | b* | ΔE* |
| --- | --- | --- | --- | --- | --- |
| Cell 1 + TEC10, bleached | 67.0 | 84.4 | −2.13 | 11.79 | 54.7 |
| Cell 1 + TEC10, colored | 2.5 | 31.28 | 1.45 | −48.85 | |
| Cell 2 + TEC10, bleached | 64.2 | 83.58 | −2.03 | 5.45 | 62.1 |
| Cell 2 + TEC10, colored | 6.4 | 21.95 | 3.24 | 4.56 | |

These IGUs also show that the color difference in the bleached and the colored state is large (greater than 35) and are suitable for use in the front entryway system. In another experiment, an IGU was made using a VLTP as described above which was laminated to another 2.2 mm thick glass using a PVB interlayer of 0.75 mm thick, and then combining this laminated panel with a 12.5 mm argon gap with a second pane which was a TEC10 glass. This IGU had an R Value of 3.5 as calculated using Windows thermal program available from Lawrence Berkeley Laboratory, Berkeley, CA

Example 3

In this example, using the same two VLTPs that are described in Example 1 were again formed into IGUs, using the second panel as frosted glass rather than TEC10 (that was used in Example 2). The frosted glass by itself has a transmission of 78.5% at 550 nm and its L*, a* and b* values respectively were 90.8, −0.86 and 1.09 and had an optical haze of 90%. Only one surface of the glass was frosted and it faced outside, the non frosted side facing the gap to form an IGU and the gap was 0.25 inches and filled with air. The transmission and the colors for these IGUs are shown in Table 3. The optical haze for all of these IGUs in colored and bleached states was also measured at 90% which provided high privacy.

TABLE 3

| EC Cell | % T at 550 nm | L* | a* | b* | ΔE* |
| --- | --- | --- | --- | --- | --- |
| Cell 1 + Frosted, bleached | 62.7 | 82.19 | −2.48 | 10.45 | 42.7 |
| Cell 1 + Frosted, colored | 2.3 | 30.11 | 2.29 | −48.48 | |
| Cell 2 + Frosted, bleached | 59.1 | 80.81 | −2.42 | 4.01 | 60 |
| Cell 2 + Frosted, colored | 6.0 | 21.16 | 3.09 | 3.88 | |

These VLT panels and IGUs containing these panels may be used in the entryway system as they show a large difference in color in the colored and bleached state in transmission (transmitted light).

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about ±10% of the numerical value. In another aspect, the degree of flexibility can be within about ±5% of the numerical value. In a further aspect, the degree of flexibility can be within about ±2%, ±1%, or ±0.05%, of the numerical value. Numerical quantities given are approximate, meaning that the term "around," "about" or "approximately" can be inferred if not expressly stated.

The discussion, description, examples and embodiments presented within this disclosure are provided for clarity and understanding. A variety of materials and configurations are presented, but there are a variety of methods, configurations and materials that may be used to produce the same results. While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A building entryway system containing a variable light transmission panel (VLTP), wherein the VLTP is used in at least one of a doorlite, a sidelite, and a transom of the building entryway system, and wherein the VLTP changes optical transmission from a clear state to a darkened state when an electric voltage is applied thereto, wherein the color difference ΔE* between the clear state and the darkened state is equal to or greater than 35.

2. The building entryway system of claim 1, wherein the VLTP is an electrochromic element.

3. The building entryway system of claim 1, wherein the VLTP is assembled with another panel as an insulated glazing unit.

4. The building entryway system of claim 1, wherein the VLTP is configured to receive electric voltage through an electronic module and the said electronic module is connected to at least one additional electronic device in the building entryway system that is not a VLTP.

5. The building entryway system of claim 4, wherein the additional electronic device is selected from at least one of electronic lock, a doorbell camera, a display, an optical indicator, a doorbell chime, an audible indicator, an audible alarm, a smoke alarm, a burglar alarm, a video interface, a thermometer, a humidity sensor, a wind sensor, a door open/shut sensor, a burglar sensor, a panic button, lighting, a motion sensor, a camera, a speaker, an audible noise generator, third party activation or a combination thereof.

6. The building entryway system of claim 1, wherein building entryway system partitions a first space located outside a building and a second space located inside the building, wherein the first space in proximity to said entryway has an illumination level of $L_1$ in lux and the second space in proximity to said entryway has an illumination level of $L_2$ in lux, and wherein the building entryway system is configured such that a privacy, P, of the first space through the VLTP from the second space is controlled by adjusting the illumination between the two spaces relative to each other and the visible transmission of the VLTP, such that a value of P≥5 according to $$P=(R \times L_2)/(T \times L_1), \text{ where}$$

R is visible reflectivity in percentage of the VLTP in the second space, and

T is visible transmission in percentage of the VLTP.

7. The building entryway system of claim 1, that forms a partition between two spaces, wherein the first space located outside the building and the second space is located inside the building, both spaces in proximity to the said VLTP element, and wherein the first space has an illumination level of $L_1$ in lux and the second space has an illumination level of $L_2$ in lux, and wherein the smart window is configured such that a privacy, P, of the first space through the said VLTP from the second space is controlled by adjusting the visible transmission of the VLTP, such that a value of P≥5 according to $$P=(R \times L_2)/(T \times L_1), \text{ where}$$

R is visible reflectivity in percentage of the VLTP in the second space, and

T is visible transmission in percentage of the VLTP.

8. The building entryway system of claim 1, further comprising a movable element in which the VLTP is located, wherein the movable element is configured to be pivotable between a closed position and an open position, and configured such that the electric voltage is connected to the VLTP when the movable element is in the closed position and the electric voltage is disconnected from the VLTP when the movable element is in the open position.

9. The building entryway system of claim 1, wherein the said VLTP panel is integrated into an IGU by combining with a second optically transmissive panel wherein the VLTP and the second optically transmissive panel are separated by a gap containing a gas or the gap is evacuated.

10. The building entryway system of claim 9, wherein the doorlite, sidelite, or transom has an R value in its center that is equal to or greater than 3 (° F.-ft$^2$-hour)/Btu).

11. The building entryway system of claim 9, wherein the second optically transmissive panel is coated with a low-e coating.

12. The building entryway system of claim 9, wherein the second optically transmissive panel is frosted.

13. A building entryway system of claim 1, wherein the building entryway system comprises a door panel comprising non-glass elements, wherein the R value of the door panel is equal to or greater than 3 (° F.-ft$^2$-hour)/Btu).

14. The building entryway system of claim 1, further comprising a rechargeable battery, a super-capacitor, a solar panel, or a combination thereof.

15. A window of a building entryway system, the window comprising an electronic module and a VLTP that forms a partition a first space located outside a building and a second space located inside the building, wherein the first space in the proximity of the entryway has an illumination level of $L_1$ in lux and the second space in the proximity of the entryway has an illumination level of $L_2$ in lux, and wherein the window is configured such that a privacy, P, of the first space through the VLTP from the second space is controlled by adjusting the visible transmission of the VLTP, such that a value of P≥5 according to $$P=(R \times L_2)/(T \times L_1), \text{ where}$$

R is visible reflectivity in percentage of the VLTP in the second space, and

T is visible transmission in percentage of the VLTP, wherein the VLTP changes optical transmission from a clear state to a darkened state when an electric voltage is applied thereto, wherein the color difference ΔE* between the clear state and the darkened state is equal to or greater than 35.

16. The window of claim 15, wherein the window is configured such that P is controllable by further adjusting the illumination between the first and second spaces relative to each other.

17. The window of claim 16, wherein the electronic module is configured to automatically control $L_1$ and $L_2$, and the transmission of the VLTP.

18. The window of claim 17, wherein the electronic module is configured to sense the light intensity in the first space and in the second space.

19. A variable transmission optical panel (VLTP) in a building entryway system, wherein the building entryway system comprises a frame and a movable element in which the VLTP is located, wherein the movable element is pivotable between a closed position and an open position, wherein electric power is supplied to the VLTP when the movable element is in the closed position, wherein the VLTP changes optical transmission from a clear state to a darkened state when an electric voltage is applied thereto, wherein the color difference ΔE* between the clear state and the darkened state is equal to or greater than 35.

* * * * *